US008688281B2

(12) United States Patent
Viassolo et al.

(10) Patent No.: US 8,688,281 B2
(45) Date of Patent: Apr. 1, 2014

(54) OPTIMIZATION OF ENERGY STORAGE DEVICE USAGE IN WIND ENERGY APPLICATIONS

(75) Inventors: Daniel Viassolo, Katy, TX (US); Bo Hesselbaek, Houston, TX (US)

(73) Assignee: Vestas Wind Systems A/S, Aarhus N. (DK)

( * ) Notice: Subject to any disclaimer, the term of this patent is extended or adjusted under 35 U.S.C. 154(b) by 673 days.

(21) Appl. No.: 12/872,514

(22) Filed: Aug. 31, 2010

(65) Prior Publication Data

US 2012/0053750 A1 Mar. 1, 2012

(51) Int. Cl.
*G06F 19/00* (2011.01)

(52) U.S. Cl.
USPC .......................................... 700/287; 290/44

(58) Field of Classification Search
USPC ......... 700/287, 291, 297; 307/18, 64; 290/44, 290/55
See application file for complete search history.

(56) References Cited

U.S. PATENT DOCUMENTS

| 4,982,569 | A | | 1/1991 | Bronicki |
| 5,225,712 | A | * | 7/1993 | Erdman ........................... 290/44 |
| 6,320,273 | B1 | * | 11/2001 | Nemec ............................. 290/55 |
| 6,963,802 | B2 | * | 11/2005 | Enis et al. .......................... 702/2 |
| 7,071,579 | B2 | * | 7/2006 | Erdman et al. ................... 290/55 |
| 7,234,409 | B2 | * | 6/2007 | Hansen .......................... 114/258 |
| 7,523,001 | B2 | * | 4/2009 | Morjaria et al. .................. 702/3 |
| 7,952,232 | B2 | * | 5/2011 | Burra et al. ...................... 307/64 |
| 2004/0267466 | A1 | * | 12/2004 | Enis et al. ........................ 702/60 |
| 2006/0171086 | A1 | | 8/2006 | Hennessy et al. |
| 2007/0080667 | A1 | * | 4/2007 | Ziegler et al. .................. 320/132 |
| 2009/0099702 | A1 | * | 4/2009 | Vyas et al. ...................... 700/287 |
| 2009/0295165 | A1 | * | 12/2009 | Giguere et al. .................. 290/55 |
| 2010/0250162 | A1 | * | 9/2010 | White et al. ..................... 702/63 |
| 2012/0049516 | A1 | * | 3/2012 | Viassolo ......................... 290/44 |

FOREIGN PATENT DOCUMENTS

| EP | 2110549 A2 | 10/2009 |
| WO | 2010038664 A1 | 4/2010 |

OTHER PUBLICATIONS

Tsung-Ying Lee, Operating schedule of Battery Energy Storage System in time of use Rate Industrial User With Wind Turbine Generators: Multipass Iteration Practicle Swarm Optimization Approch, Sep. 2007, IEEE, p. 774-782.*

European Patent Office, International Search Report and Written Opinion issued in related International application No. PCT/DK2011/050318 dated Nov. 16, 2011.

* cited by examiner

*Primary Examiner* — Kidest Bahta
(74) *Attorney, Agent, or Firm* — Patterson & Sheridan, LLP (57) ABSTRACT

System, method, and computer program product for optimally scheduling energy storage devices in wind energy applications. The power production system includes an energy storage device configured to service a first energy storage application at the first wind farm and a supervisory controller configured to determine if an attribute of the energy storage device is less than or equal to a threshold for the first energy storage application. In response to the attribute being less than or equal to a threshold for the first energy storage application, the supervisory controller schedules the energy storage device for a second energy storage application at the first wind farm or at a second wind farm different than the first wind farm. The optimization of the scheduling may be implemented in a computer-implemented method or as a computer program product.

20 Claims, 6 Drawing Sheets

OPTIMIZATION OF ENERGY STORAGE DEVICE USAGE IN WIND ENERGY APPLICATIONS

BACKGROUND

This application relates generally to electrical power generation and, more specifically, to the optimization of energy storage device usage in wind energy applications.

A utility-scale wind energy system or wind farm includes a group of wind turbines that operate collectively as a power plant to produce electrical energy without the consumption of fossil fuels. The output of wind energy from a wind farm is less consistent than the energy output from fossil fuel-fired power plants. As a result, the power from wind turbines operating at nominal conditions in a wind farm may not meet output requirements for the power plant. For example, the power from a power plant may not track the power forecast due to forecast errors. As another example, the rate of power production for a power plant may be outside of a desired range because of wind gusts. A conventional approach for dealing with these and other similar situations is to use controls to manage the operation of the wind farm, such as utilizing pitch control of the rotor blades to increase or decrease the power produced by the individual wind turbines.

Traditional utility-scale wind energy systems are not dispatchable sources of electricity that can be turned on or off at the request of power grid operators. For that reason, a wind farm may include an energy storage device, such as one or more rechargeable batteries, that is linked to the power grid and that may assist with meeting requirements on the power production by the power plant. Energy storage systems can be used to shift power production by a wind farm from off-peak times to peak load times. Energy storage systems can store curtailed production for later release to the power grid. The ability to store energy during times of high wind turbine production and release the stored energy during times of low wind production also allows a wind farm to improve power production forecast accuracy. The accuracy improvements allow wind farms to meet firm capacity commitments to power companies and to avoid expensive penalties.

The pattern of charge and discharge cycles for intermittent generators, such as wind turbines, may be irregular dependent upon the application or combination of applications served by the wind farm. Nevertheless, a battery experiencing on average a single daily charge and discharge for twenty years in a wind farm accumulates roughly 7,300 cycles. As a result, candidate batteries of wind farms must be characterized by long cycle lifetimes. Battery life is dependent on both the depth of discharge and the rate of discharge, as well as other external factors such as temperature, charging strategy, etc.

Accordingly, the management of energy storage systems must be improved to optimize the use of energy storage systems, such as batteries, in wind energy applications.

BRIEF SUMMARY OF THE INVENTION

In one embodiment of the invention, a power production system includes a wind farm comprising a plurality of wind turbines, an energy storage device configured to service a first energy storage application at the first wind farm, and a supervisory controller configured to determine if an attribute of the energy storage device is less than or equal to a threshold for the first energy storage application and to schedule the energy storage device for a second energy storage application at the first wind farm or at a second wind farm different than the first wind farm.

In another embodiment of the invention, a computer-implemented method is provided for optimizing energy storage device scheduling in wind energy applications. The method includes comparing an attribute of an energy storage device at a first wind farm with a threshold for a first energy storage application served by the energy storage device at the first wind farm. In response to the attribute being less than or equal to the threshold, the energy storage device is scheduled for a second energy storage application at the first wind farm or at a second wind farm different than the first wind farm.

BRIEF DESCRIPTION OF THE SEVERAL VIEWS OF THE DRAWINGS

The accompanying drawings, which are incorporated in and constitute a part of this specification, illustrate various embodiments of the invention and, together with a general description of the invention given above and the detailed description of the embodiments given below, serve to explain the embodiments of the invention.

DETAILED DESCRIPTION

Generally, the embodiments of the invention are directed to optimizing energy storage device usage in wind energy applications through appropriate energy device scheduling among different applications, in either the same or different wind farms. In representative embodiments, the managed energy storage devices are batteries although the invention is not so limited.

Figure 1:
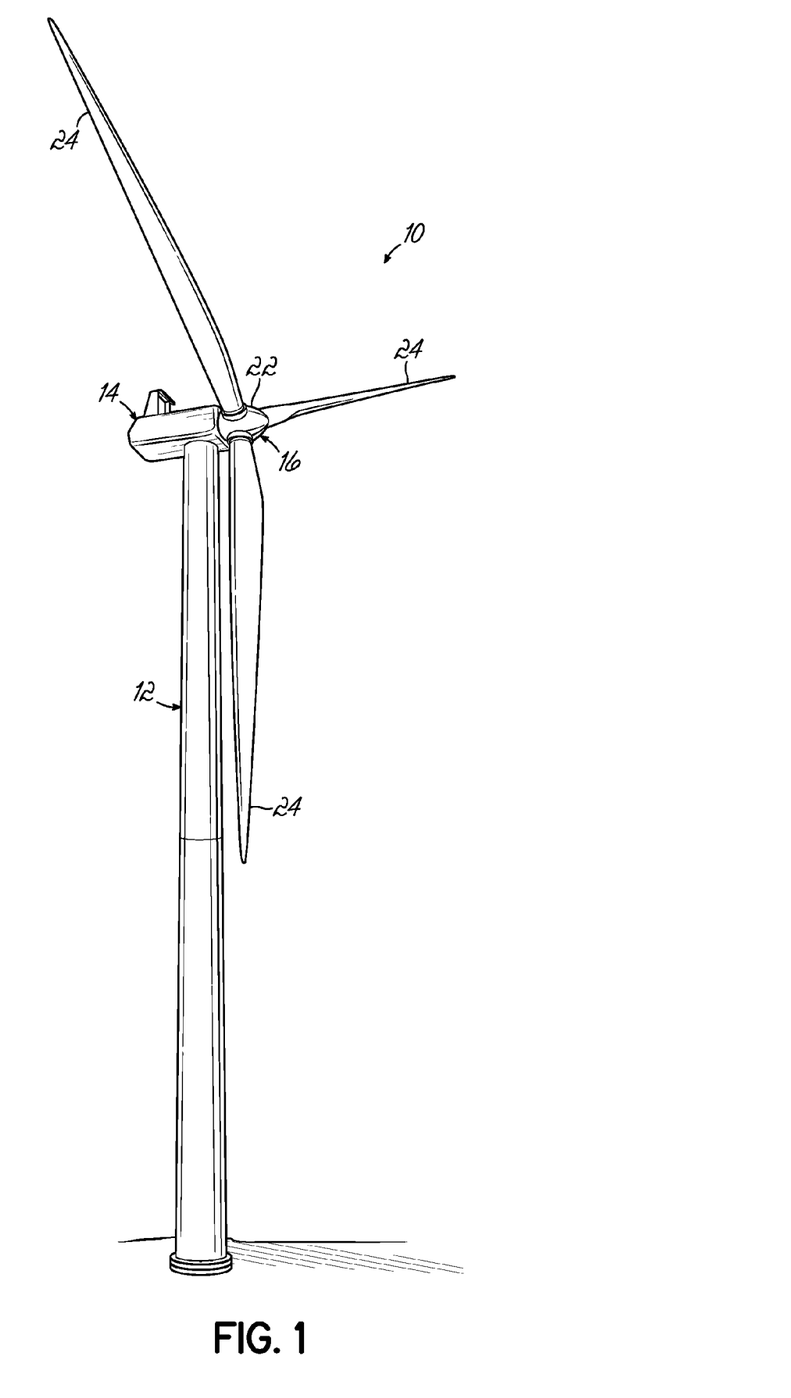
FIG. 1 is a perspective view of a wind turbine typical of that used in a wind farm.
Figure 2:
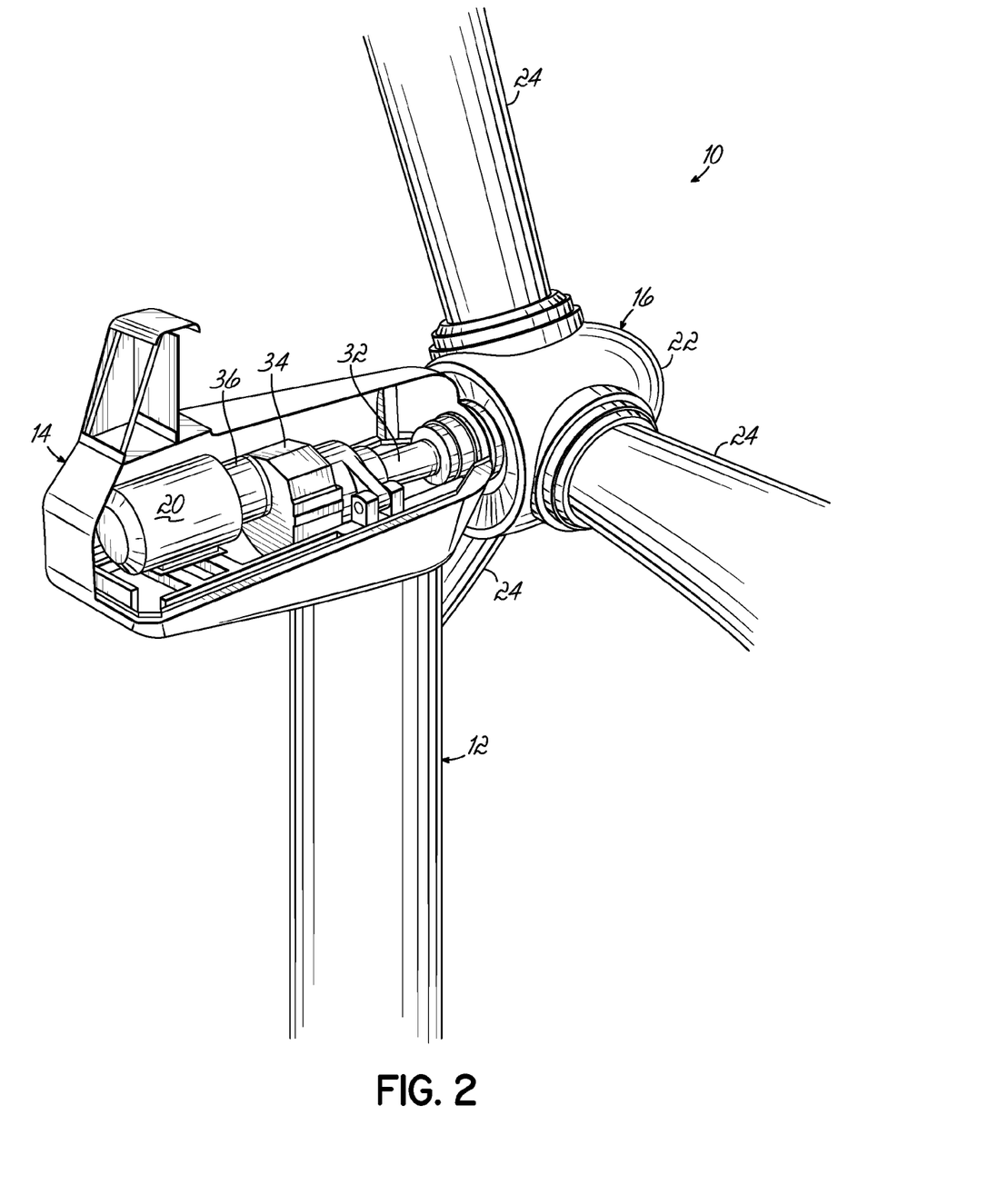
FIG. 2 is a perspective view of a portion of the wind turbine of FIG. 1 in which the nacelle is partially broken away to expose structures housed inside the nacelle.

With reference to FIGS. 1 and 2, the following description of wind turbine 10 applies equally to all wind turbines in this specification. Wind turbine 10 includes a tower 12, a nacelle 14 disposed at the apex of the tower 12, and a rotor 16 operatively coupled to a generator 20 housed inside the nacelle 14. In addition to the generator 20, nacelle 14 houses various components needed to convert wind energy into electrical energy and also various components needed to operate and optimize the performance of the wind turbine 10. The tower 12 supports the load presented by the nacelle 14, rotor 16, and other wind turbine components housed inside the nacelle 14. The tower 12 of the wind turbine 10 operates to elevate the nacelle 14 and rotor 16 to a height above ground level or sea level, as may be the case, at which air currents having lower turbulence and higher velocity are typically found.

The rotor 16 includes a central hub 22 and a plurality of blades 24 attached to the central hub 22 at locations distributed about the circumference of the central hub 22. In the representative embodiment, the rotor 16 includes three blades 24. The blades 24, which project radially outward from the central hub 22, are configured to interact with the passing air currents to produce lift that causes the central hub 22 to spin about its longitudinal axis. The design, construction, and operation of the blades 24 are familiar to a person having ordinary skill in the art. For example, pitch angle control of the blades 24 may be implemented by a pitch control mechanism (not shown).

The rotor 16 is coupled by a drive shaft 32 and a gearbox 34 with the rotor assembly of the generator 20. The gearbox 34 relies on gear ratios in a drive train to provide speed and torque conversions from the rotation of the rotor 16 to the rotor assembly of the generator 20. Alternatively, the drive shaft 32 may directly connect the central hub 22 of the rotor 16 with the rotor assembly of the generator 20 so that rotation of the central hub 22 directly drives the rotor assembly to spin relative to a stator assembly of the generator 20. A mechanical coupling 36 provides an elastic connection between the drive shaft 32 and the gear box 34.

The wind turbine 10, which is depicted as a horizontal-axis wind turbine, has the ability to convert the kinetic energy of the wind into electrical power. Specifically, the motion of the rotor assembly of generator 20 relative to the stator assembly of generator 20 functionally converts the mechanical energy supplied from the rotor 16 into electrical power so that the kinetic energy of the wind is harnessed by the wind turbine 10 for power generation. Wind exceeding a minimum level will activate the rotor 16 and cause the rotor 16 to rotate in a direction substantially perpendicular to the wind. Under normal circumstances, the electrical power is supplied to the power grid 40 as known to a person having ordinary skill in the art.

Figure 3:
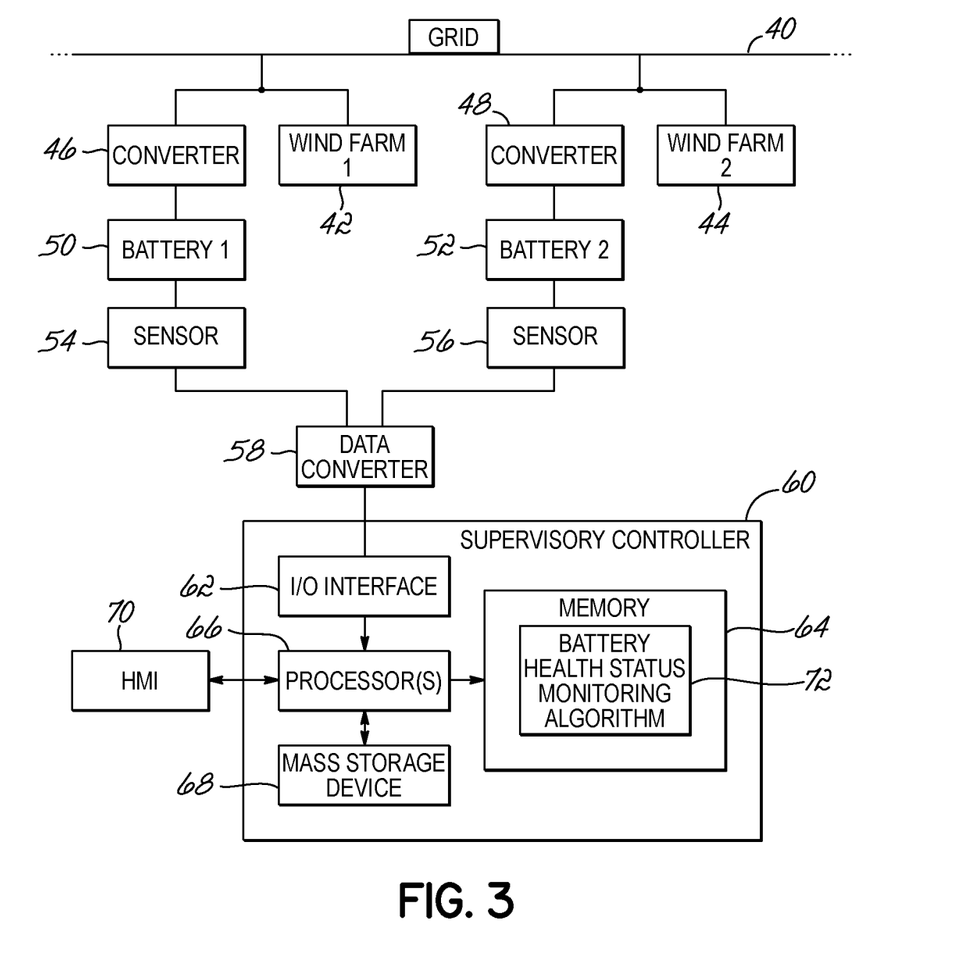
FIG. 3 is a diagrammatic view of wind farms with batteries that supplement the operation of the wind turbines in the wind farms.

With reference to FIG. 3 and in accordance with an embodiment of the invention, the wind farms 42, 44 each include one or more wind turbines, such as the representative wind turbine 10. The wind turbines collectively act as a generating plant ultimately interconnected by transmission lines with the power grid 40, which may be a three-phase power grid. Where the wind farm has more than one turbine, each wind farm 42, 44 gangs the wind turbines together at a common location in order to take advantage of the economies of scale that decrease per unit cost with increasing output. It is understood by a person having ordinary skill in the art that wind farms 42, 44 may include an arbitrary number of wind turbines of given capacity in accordance with a targeted power output.

The power grid 40 generally consists of a network of power stations, transmission circuits, and substations coupled by a network of transmission lines. The power stations generate electrical power by nuclear, hydroelectric, natural gas, or coal fired means, or with another type of renewable energy like solar and geothermal. Additional wind farms analogous to the wind farms 42, 44 depicted may also be coupled with the power grid 40. Power grids and wind farms typically generate and transmit power using Alternating Current (AC). Because the batteries 50, 52 can only store and release electrical energy in the form of Direct Current (DC), power converters 46, 48 are required to convert between AC power usable by the wind farms 42, 44 and the power grid 40, and DC power usable by the batteries 50, 52.

The converters 46, 48 are electrically connected between the power grid 40 and respective batteries 50, 52. The converters 46, 48 include active switches, such as power semiconductor devices, in a configuration suitable to transform AC power supplied by wind farms 42, 44 into DC power during times when batteries 50, 52 are storing excess power supplied from the wind farms 42, 44 and to transform DC power into AC power at times when batteries 50, 52 are supplying power to the grid 40. When batteries are charging by storing power received from wind farms 42, 44, converters 46, 48 condition the output from the wind farms 42, 44 to provide a DC output voltage and current suitable for charging batteries 50, 52. When batteries 50, 52 are providing power to the grid 40, converters 46, 48 condition the energy discharged by the respective batteries 50, 52 to provide an output voltage and current at a frequency and phase appropriate for transmission to the power grid 40. The design, construction, and operation of converters 46, 48 is understood by a person having ordinary skill in the art.

At least one sensor 54 is operatively coupled to battery 50 and at least one sensor 56 is operatively coupled to battery 52. The sensors 54, 56 are each configured with one or more sensors to detect and monitor one or more battery operational parameters, including but not limited to voltage, battery current, and temperature, and to generate signals representative of each sensed battery operational parameter. A data converter 58 receives reading in the form of signals communicated as data from sensors 54, 56 and communicates the readings to a supervisory controller 60.

In the representative embodiment, the batteries 50, 52, as well as battery 51 described hereinbelow, may include one or more rechargeable electro-chemical storage batteries including, but not limited to, sodium sulfur batteries, lithium ion batteries, and vanadium redox batteries. In alternative embodiments, the supervisory controller 60 can manage a different type of energy storage device, such as flywheels or banks of capacitors, capable of receiving and stably storing electrical energy, and also capable of discharging the stored electrical energy. In yet another alternative embodiment, the energy storage devices managed by the computed actions of the supervisory controller 60 may be hybrid in the sense that energy storage device may include devices of different types, such as one or more flywheels, one or more banks of capacitors, one or more rechargeable batteries, or combinations of these devices. In the representative embodiment, decisions about battery usage across different wind energy applications are made based upon perceived changes in battery capacity; however, a different attribute of the batteries may be measured and assessed by the supervisory controller 60 in its computations and, if the energy devices that are managed are not limited to batteries, other attributes may be measured and assessed by the supervisory controller 60 in its computations.

The supervisory controller 60 can be implemented using one or more processors 66 selected from microprocessors, micro-controllers, digital signal processors, microcomputers, central processing units, field programmable gate arrays, programmable logic devices, state machines, logic circuits, analog circuits, digital circuits, and/or any other devices that manipulate signals (analog and/or digital) based on operational instructions that are stored in a memory 64. Memory 64 may be a single memory device or a plurality of memory devices including but not limited to read-only memory (ROM), random access memory (RAM), volatile memory, non-volatile memory, static random access memory (SRAM), dynamic random access memory (DRAM), flash memory, cache memory, and/or any other device capable of storing digital information. Mass storage device 68 may be a single mass storage device or a plurality of mass storage devices including but not limited to hard drives, optical drives, tape drives, non-volatile solid state devices and/or any other device capable of storing digital information. An Input/Output (I/O) interface 62 may employ a suitable communication protocol for communicating with at least the data converter 58.

Processor 66 operates under the control of an operating system, and executes or otherwise relies upon computer program code embodied in various computer software applications, components, programs, objects, modules, data structures, etc. to read data from and write instructions to the data converter 58 through I/O interface 62, whether implemented as part of the operating system or as a specific application. The resident computer program code executing on supervisory controller 60 as a set of instructions includes a battery health status monitoring algorithm (BHSMA) 72 operative to collect and store in memory 64, and/or in the mass storage device 68, battery operational parameters received from sensors 54, 56 as transmitted by data converter 58 through I/O interface 62, as well as to analyze the battery operational parameters in order to assess the health of the batteries 50, 52 and to manage the use of the batteries 50, 52 based upon the health assessment as described by the various embodiments of the invention. The supervisory controller 60 may use the BHSMA 72 to periodically determine an optimal battery scheduling based on the battery operational parameters, the current and predicted capacity of the batteries 50, 52, the forecast operational requirements of a particular energy storage application, and the inherent characteristics of the battery 50, 52.

A human machine interface (HMI) 70 is operatively coupled to the processor 66 of the supervisory controller 60 in a known manner. The HMI 70 may include output devices, such as alphanumeric displays, a touch screen, and other visual indicators, and input devices and controls, such as an alphanumeric keyboard, a pointing device, keypads, pushbuttons, control knobs, etc., capable of accepting commands or input from the operator and transmitting the entered input to the processor 66.

Figure 4:
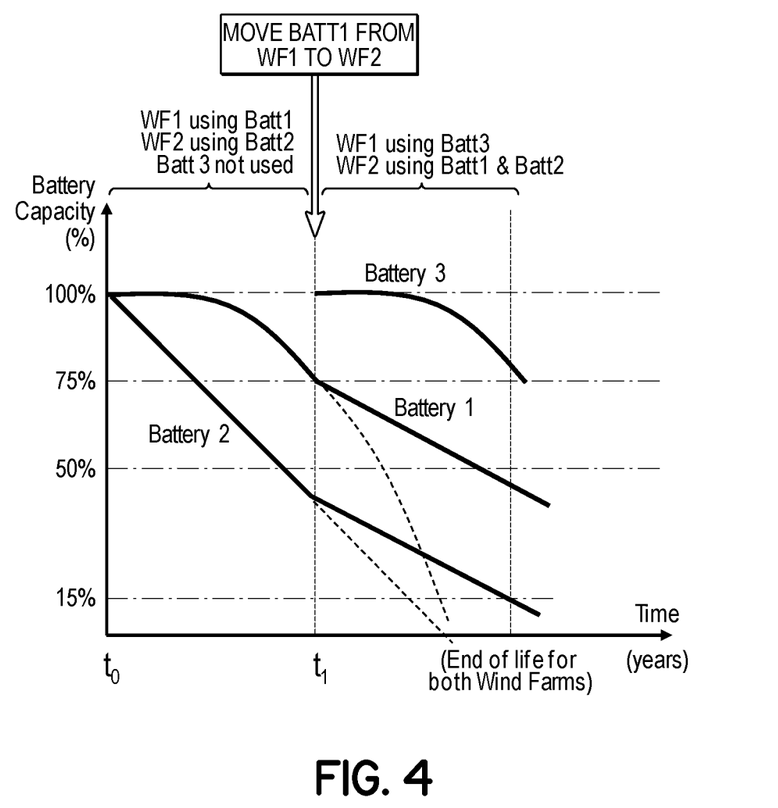
FIG. 4 is a graphical view showing the degradation of battery capacity over time for the batteries in the wind farms of FIG. 3 and the reallocation of the batteries to optimize the scheduling of the batteries across multiple wind farms in accordance with an embodiment of the invention.
Figure 5:
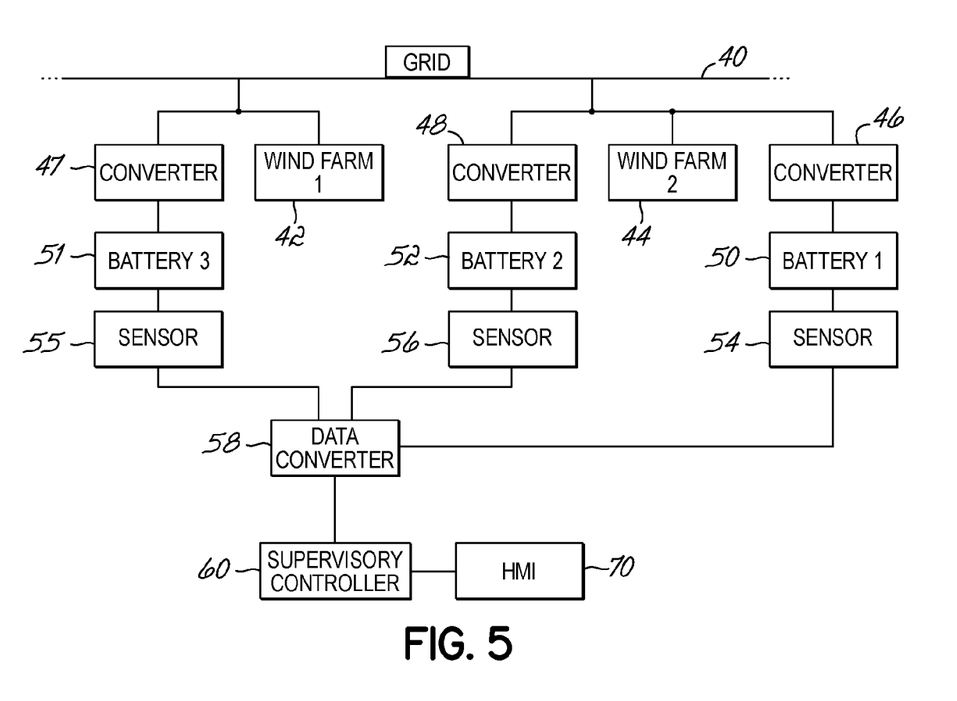
FIG. 5 is a diagrammatic view similar to FIG. 3 in which one of the batteries has been moved to a different wind farm based upon capacity degradation in FIG. 4 and replaced with a different battery based upon optimization in accordance with an embodiment of the invention.

With reference to FIG. 5, an exemplary battery scheduling for the batteries 50, 52 (FIG. 4) is presented. Time $t_0$ represents the time at which batteries 50, 52 are put into service at wind farms 42, 44. At time $t_0$, both batteries 50, 52 have 100% of their designed battery capacity, which is sufficient to satisfy the application requirements for energy storage at the respective wind farms 42, 44. The BHSMA 72 executing on the supervisory controller 60 regularly collects and stores data relating to the capacity and operating conditions of the batteries 50, 52, which is acquired by sensors 54, 56 and communicated by data converter 58 through I/O interface 62 to the supervisory controller 60.

At any instant in time, the batteries 50, 52 are characterized by a battery capacity that may be expressed as either a state of charge (SOC) or a depth of discharge (DOD). The SOC reflects the charge level of the batteries 50, 52 or, in other words, the available charge capacity remaining in each of the batteries 50, 52 numerically expressed as a percentage of a rated charge capacity. An SOC of 100 percent indicates a full charge relative to the rated charge capacity, an SOC of 0 percent indicates that the battery 50 is fully discharged relative to the rated charge capacity, and an SOC (e.g., 35 percent) between fully discharged and fully charged indicates that the battery 50 is only partially charged. In one embodiment, the SOC for batteries 50, 52 can be determined by measuring battery voltage with the sensors 54, 56 and then converting the battery voltage with a calculation using a known discharge curve of voltage as a function of the SOC for the battery 50. The values of SOC may be compensated to correct for temperature and/or battery current. Alternatively, the SOC for batteries 50, 52 may be determined by measuring the battery currents as a function of time and converting the battery current with a calculation that time integrates the battery currents. The supervisory controller 60 may be used to calculate the SOC of batteries 50, 52.

Depth of discharge (DOD) is an alternate quantity for use in characterizing the charge status of battery 50 and is determined from changes in the SOC of the battery 50. The DOD represents the amount of charge capacity removed from a charged battery 50 and the amount of charge capacity then restored to the charged battery 50 numerically expressed as a fraction of a rated charge capacity for the battery 50. A DOD of unity (1) indicates that the battery 50 is fully discharged and then fully charged, and a DOD between 0 and 1 indicates that the battery 50 is only partially charged and partially discharged.

Alternatively, the SOC and the DOD may be expressed in terms of ampere-hours instead of the fraction of rated capacity or as a percentage. For example, the removal of 250 ampere-hours from the battery 50 rated at 1000 ampere-hours and the subsequent addition of 250 ampere-hours to the battery 50 results in a DOD of 0.25 as expressed herein.

As time advances from the initial time $t_0$, the capacities of the batteries 50, 52 degrade, as represented by their respective solid lines. Due to differing energy storage application demands at wind farms 42, 44, the capacity of battery 50 degrades at a parabolic rate with respect to time, while that of battery 52 degrades in a linear—and initially higher—rate. The degradation is reflected by the reduction in battery capacity for the batteries 50, 52 as time lapses.

The supervisory controller 60 will use the BHSMA 72 to compute battery capacity for batteries 50, 52 and to compare the measured battery capacity with a minimum energy storage capacity requirement for an application or combination of applications associated with each of the batteries 50, 52. As shown in FIG. 4, prior to time $t_1$, the batteries 50, 52 satisfy the minimum energy storage application capacity requirements, and thus no battery scheduling changes are necessary.

At time $t_1$, the battery capacity of battery 50 has decreased to a value that no longer satisfies the minimum battery capacity for energy storage required by the energy storage application for battery 50 at wind farm 42. In this instance, the battery capacity of battery 50 has degraded to 75% of its initial value. The BHSMA 72 recognizes this occurrence and, in response to the determination of inadequate capacity, the BHSMA 72 notifies the operator of wind farm 42 of the occurrence. This triggers a sequence of events that allocates a different battery 51, which is typically rated with 100% of its designed battery capacity, to the energy storage application at wind farm 42. The wind farm operator will uninstall battery 50 at wind farm 42 and install battery 51 at wind farm 42 to serve the application formerly served by battery 50. A converter 47, similar in construction and function to converters 46, 48, is electrically connected between the power grid 40 and battery 51. At least one sensor 55, which is similar to sensors 54, 56, is operatively coupled to battery 51 and, similar to sensors 54, 56, sends readings in the form of signals to the data converter 58 for communication to the supervisory controller 60.

The BHSMA 72 executing on the supervisory controller 60 will then optimize the battery scheduling across multiple wind farms, including but not limited to wind farm 42, by determining whether or not the removed battery 50 can be reallocated to a different application at a different wind farm. In the representative embodiment, the BHSMA 72 determines an optimum battery scheduling that allocates battery 50 to wind farm 44, where its capacity is added to that already provided by battery 52. The reallocation of battery 50 to wind farm 44 and the introduction of battery 51 to wind farm 42 are apparent in FIG. 5, which depicts the new arrangement for the batteries 50, 51, 52 at the wind farms 42, 44.

The rationale for the reallocation is readily apparent from an examination of FIG. 4. Battery 52 at wind farm 44 also has a threshold battery capacity at which battery 52 no longer satisfies the minimum battery capacity for energy storage required by the energy storage application for battery 52 at wind farm 44. For purposes of discussion, this threshold value for battery 52 may be presumed to be 15 percent. The trajectories (dotted lines) for the degradation of battery capacities of batteries 50, 52, if undisturbed, would result in neither of the batteries 50, 52 providing service for the respective intended applications until the end of life for wind farms 42, 44. Specifically, the battery capacities for both batteries 50, 52 would degrade to respective values less than their 75 percent and 15 percent thresholds of their respective energy storage applications before the end of life of their respective wind farms 42, 44.

However, in the optimal scheduling recommended by the BHSMA 72, the projected battery capacities (solid lines), the reallocation of battery 50 to supplement battery 52 at wind farm 44 permits the combination of batteries 50, 52 to have a sufficient battery capacity to serve the energy storage application at wind farm 44 until the end of life for wind farm 44. Because battery 50 is reallocated to support battery 52 at wind farm 44, their collective battery capacities will reduce the slope of the linear degradation trajectory for battery 52.

The storage capacity of battery 51 will degrade over time in the same manner as battery 50 in use to serve the energy storage application at wind farm 42. However, despite the degradation, the storage capacity of battery 51 remains adequate to service the energy storage application at wind farm 42 until the end of life for wind farm 42. As a result, the time-sequenced use of battery 50 and battery 51 at wind farm 42 services the energy storage application at wind farm 42 until the end of life for wind farm 42.

By reallocating battery 50 to serve the energy storage application at wind farm 44 instead of removing it from service or leaving it at wind farm 42, the recommendations on battery scheduling determined by the BHSMA 72 avoids any additional battery reallocations during the useful life span of wind farms 42, 44. Thus, the battery scheduling shown in FIG. 5 represents an optimal battery scheduling over the life of wind farms 42, 44.

In alternative embodiments, the BHSMA executing on the supervisory controller 60 may manage additional batteries and energy storage applications at a multiplicity of wind farms in addition to wind farms 42, 44.

Figure 6:
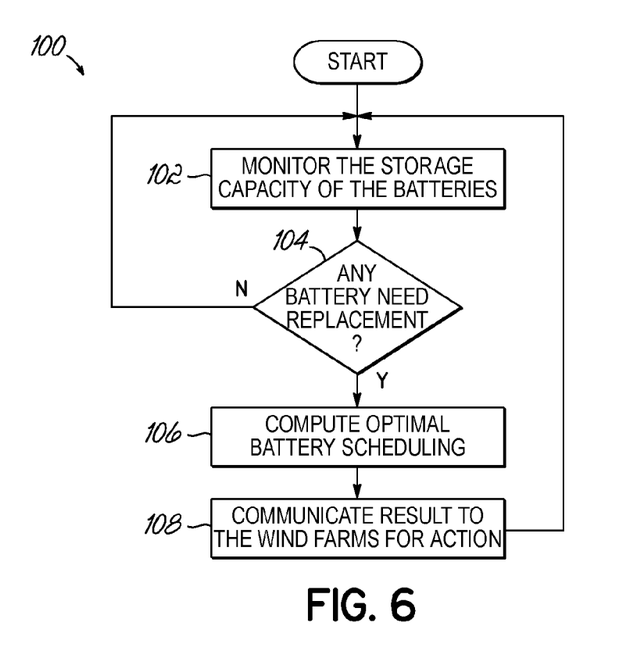
FIG. 6 is a flow chart of a method of implementing optimal battery scheduling across multiple wind farms in accordance with an embodiment of the invention.

FIG. 6 shows a flowchart 100 illustrating a sequence of operations for the supervisory controller 60 that may be used to schedule battery operations across multiple wind farms. In block 102, the supervisory controller 60 receives sensor readings from sensors that are monitoring the health of various batteries at different wind farms, such as battery 50 at wind farm 42 and battery 52 at wind farm 44. The BHSMA 72 will calculate a battery capacity for each battery from the capacity sensor data.

In block 104, the BHSMA 72 periodically determines whether the storage capacity for any of the monitored batteries has degraded to become insufficient for the respective application for energy storage. In one embodiment, the BHSMA 72 maintains a threshold battery capacity for an energy storage application served by each battery in a database or other type of data storage structure accessible to programs running on the supervisory controller 60. The energy storage application database may be maintained on the mass storage device 68 or in the memory 64 of the supervisory controller 60. The BHSMA 72 compares the battery capacity for energy storage for each of the monitored batteries with a minimum energy storage capacity maintained as an entry in the energy storage application database. If all batteries are projected to satisfy their intended energy storage application for the life of their respective wind farm, then the BHSMA 72 will continue to monitor the storage capacity of each monitored battery ("No" branch of decision block 104). However, if the BHMSA 72 determines that any of the monitored batteries has degraded such that the respective battery capacity fails to satisfy the minimum requirement for the application served to reach the expected end of life of the corresponding wind farm, the BHSMA 72 will mark that particular battery as capacity deficient or approaching capacity deficiency ("Yes" branch of decision block 104). The capacity deficient battery will be replaced by a different battery having a battery capacity projected to be adequate to serve the application formerly served by the capacity deficient battery and, preferably, to serve that application until the end of life of the corresponding wind farm.

In block 106, the BHSMA 72 computes an optimal battery scheduling for all of the monitored batteries and across all of the wind farms. The BHSMA 72 will evaluate, among its computations, the consumed battery life and the remaining battery life for each of the batteries in an attempt to find a new location with a different application for the capacity deficient battery. The capacity deficient battery may serve a new application at its new location either alone or in combination with another battery. The latter event may use the capacity deficient battery to extend the life of an existing battery. The BHSMA 72 may recommend immediate installation of the capacity deficient battery to perform a different application either at the same wind farm or at a different wind farm, or the BHSMA 72 may recommend that the installation be delayed.

To calculate the battery scheduling, the BHSMA 72 may take into account the projected future capacities of all batteries 50, 51, 52 managed by the supervisory controller 60; the minimum energy storage capacity requirements in the energy storage application database; and how long the battery scheduling will satisfy the minimum energy storage capacity requirements. Projected future capacities of batteries 50, 51, 52 may be determined based on historical data on energy capacity and operating conditions obtained from the sensors 54, 56; a battery life curve for each of the batteries 50, 51, 52; and forecasts of energy storage application functional requirements. Other data used in calculating the permutation battery service life may be data collected by the BHSMA 72; data entered into the supervisory controller 60 through the HMI 70; data otherwise entered into or generated internally by the supervisory controller 60; or data residing in lookup tables and/or databases, such as the energy storage application database.

In block 108, the optimal battery scheduling is communicated to the wind farms for action in terms of battery placement. Control then returns to block 102 to continue the battery monitoring.

As their battery capacities degrade over time, optimizing and maximizing the useful lifetime of wind farm batteries may provide significant economic benefits. Batteries typically represent a large capital investment and often represent a large fraction of the overall cost of a wind farm. The monetary value of power produced by a wind farm may be enhanced by optimizing battery scheduling because storage capacities are better matched with applications of different functional storage requirements. In order to simultaneously optimize battery lifetime and wind farm power economic value, the BHSMA 72 may be used to allocate batteries to serve in different applications taking into account, among other items, the degradation in battery capacity. To assist with this allocation process, sensors may be deployed that measure battery capacity and supply those readings at regular intervals to the BHSMA 72. At each appropriate control interval, the supervisory controller 60 reallocates the batteries across multiple wind farms or within a wind farm to optimize scheduling based on predicted future functional requirements and projected battery condition.

Figure 7:
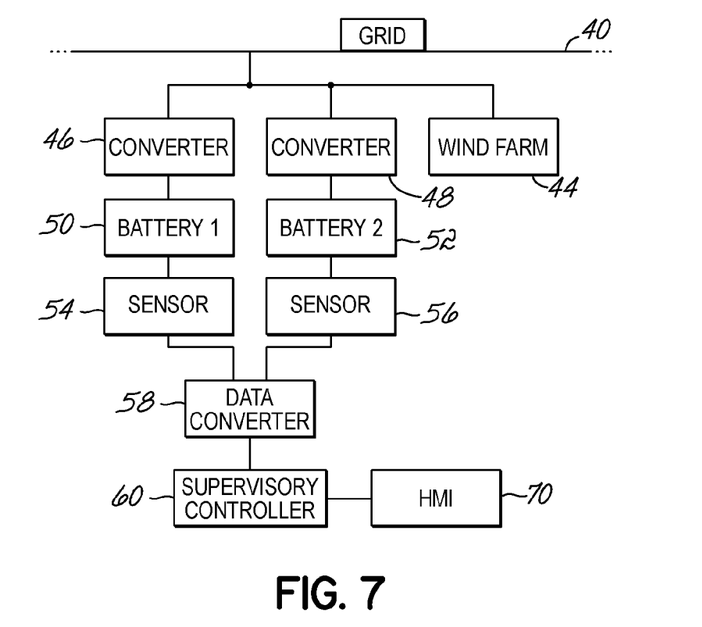
FIG. 7 is a diagrammatic view of a wind farm that includes a battery servicing an application.
Figure 8:
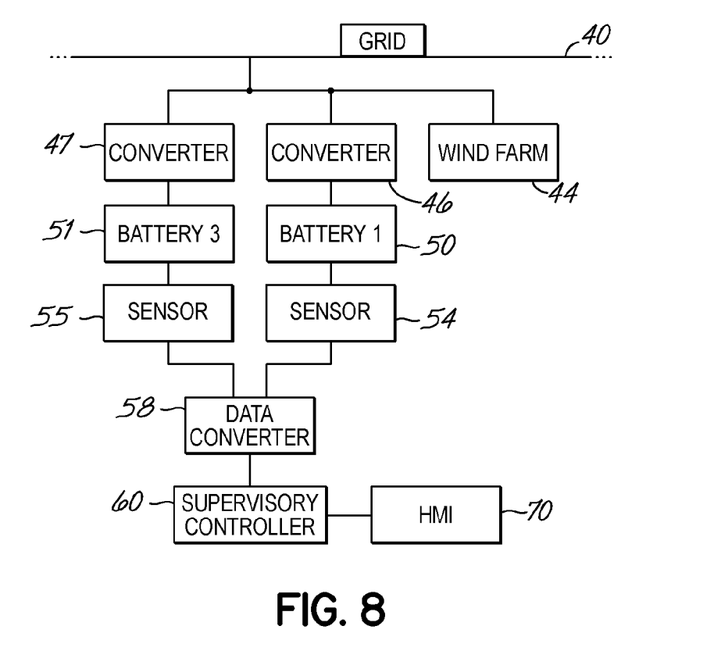
FIG. 8 is a diagrammatic view of the wind farm of FIG. 7 in which a battery has been moved to a different application within the wind farm based upon optimization in accordance with an embodiment of the invention.

With reference to FIGS. 7 and 8 in which like reference numerals refer to like features in FIG. 6 and in accordance with an embodiment of the invention, wind farm 44 includes both batteries 50, 52, but each of the batteries 50, 52 serves a different energy storage application that require different energy storage system characteristics.

With initial reference to FIG. 7, battery 50 serves a more demanding energy storage application at wind farm 44 than the energy storage application served by battery 52. As a result, the battery capacity of battery 50 for energy storage degrades at an accelerated rate relative to energy storage application served by battery 52. Eventually, the energy storage capacity of battery 50 falls below a minimum energy storage capacity requirement for its particular application before the end of life for wind farm 44. The BHSMA 72 executing on the supervisory controller 60 will sense the degradation of battery 50 and, because battery 50 is inadequate for its intended application, will determine a different optimal battery usage pattern for battery scheduling.

In FIG. 8, the operator of the wind farm 44 has implemented the optimal battery usage pattern determined by the BHSMA 72. The BHSMA 72 allocates a new battery 51 to replace battery 50. Battery 51 may be selected to satisfy the minimum energy storage capacity requirements for the more demanding energy storage application at wind farm 44 for the remainder of the expected life of wind farm 44. However, because battery 50—even in its degraded state—has a higher remaining storage capacity than battery 52, the BHMSA 72 can recommend to the operator of wind farm 44 that battery 52 be replaced by battery 50. In its new application, the battery capacity of battery 50 for energy storage may satisfy the capacity requirements of the less demanding energy storage application originally served by battery 52 for the remainder of the expected lifespan of wind farm 44. The optimal battery usage pattern satisfies the minimum energy storage capacity requirements of both energy storage applications at wind farm 44 beyond the expected end of life for wind farm 44, and may avoid additional movements of the batteries 50, 51 prior to the end of life of wind farm 44. The BHMSA 72 may determine that battery 52 can be moved to a different wind farm to service an application at that wind farm or battery 52 may simply be discarded.

As will be appreciated by one skilled in the art, the embodiments of the invention may also be embodied in a computer program product embodied in at least one computer readable storage medium having computer readable program code embodied thereon. The computer readable storage medium may be an electronic, magnetic, optical, electromagnetic, infrared, or semiconductor system, apparatus, or device, or any suitable combination thereof, that can contain, or store a program for use by or in connection with an instruction execution system, apparatus, or device. Exemplary computer readable storage media include, but are not limited to, a hard disk, a floppy disk, a random access memory, a read-only memory, an erasable programmable read-only memory, a flash memory, a portable compact disc read-only memory, an optical storage device, a magnetic storage device, or any suitable combination thereof. Computer program code for carrying out operations for the embodiments of the present invention may be written in one or more object oriented and procedural programming languages.

The methods described herein can be implemented by computer program instructions supplied to the processor of any type of computer to produce a machine with a processor that executes the instructions to implement the functions/acts specified herein. These computer program instructions may also be stored in a computer readable medium that can direct a computer to function in a particular manner. To that end, the computer program instructions may be loaded onto a computer to cause the performance of a series of operational steps and thereby produce a computer implemented process such that the executed instructions provide processes for implementing the functions/acts specified herein.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Furthermore, to the extent that the terms "includes", "having", "has", "with", "composed of", or variants thereof are used in either the detailed description or the claims, such terms are intended to be inclusive in a manner similar to the term "comprising."

While the invention has been illustrated by a description of various embodiments and while these embodiments have been described in considerable detail, it is not the intention of the applicant to restrict or in any way limit the scope of the appended claims to such detail. Additional advantages and modifications will readily appear to those skilled in the art. The invention in its broader aspects is therefore not limited to the specific details, representative methods, and illustrative examples shown and described. Accordingly, departures may be made from such details without departing from the spirit or scope of applicant's general inventive concept.

What is claimed is:

1. A power production system comprising:
   a first wind farm comprising a plurality of wind turbines;
   an energy storage device located at a first physical location at the first wind farm and configured to serve a first energy storage requirement at the first wind farm; and
   a supervisory controller configured to:
      upon determining that an attribute of the energy storage device is less than or equal to a threshold for the first energy storage requirement, schedule the energy storage device for physical relocation from the first physical location to a second physical location to service a second energy storage requirement at one or more of the first wind farm and a second wind farm; and
      communicate with the energy storage device at the second physical location.

2. The power production system of claim 1, wherein the energy storage device is a battery, and the attribute is battery capacity.

3. The power production system of claim 2, further comprising:
  a sensor operatively coupled with battery, the sensor configured to acquire readings of voltage or current during the operation of the battery in the first wind farm and to communicate the readings to the supervisory controller for use in determining if the battery capacity of the battery is less than or equal to the threshold for the first energy storage requirement.

4. The power production system of claim 1, wherein the second energy storage requirement is at the first wind farm, and the supervisory controller is configured to cause the installation of the energy storage device at the first wind farm to provide stored energy for the second energy storage requirement.

5. The power production system of claim 1, wherein the second energy storage requirement is at the second wind farm, and the supervisory controller is configured to cause the installation of the energy storage device at the second wind farm to provide stored energy for the second energy storage requirement.

6. The power production system of claim 1, wherein each of the first energy storage requirement and the second energy storage requirement is one of power fluctuation suppression, grid power stabilization, power forecast accuracy improvement, transmission curtailment power storage, power capacity firming, and power production time shifting.

7. A computer-implemented method of optimizing energy storage device scheduling in wind energy applications, the method comprising:
  comparing, via a computer processor, an attribute of a first energy storage device located at a first physical location at a first wind farm with a threshold for a first energy storage requirement served by the first energy storage device at the first wind farm;
  in response to the attribute being less than or equal to the threshold, scheduling, via a computer processor, the first energy storage device for physical relocation from the first physical location to a second physical location to serve a second energy storage requirement at one or more of the first wind farm and a second wind farm; and
  communicating, via a computer processor, with the first energy storage device at the second physical location.

8. The computer-implemented method of claim 7, wherein the first energy storage device is a battery, and the attribute is battery capacity.

9. The computer-implemented method of claim 8, further comprising:
  sensing voltage or current during the operation of the battery in the first wind farm; and
  in response to changes in the sensed voltage or the sensed current, determining if the battery capacity of the battery is less than or equal to the threshold for the first energy storage requirement.

10. The computer-implemented method of claim 7, wherein the second energy storage requirement is at the first wind farm, and scheduling the first energy storage device to serve the second energy storage requirement further comprises:
  causing the first energy storage device to be uninstalled from serving the first energy storage requirement;
  causing a second energy storage device to be installed at the first wind farm to serve the first energy storage requirement; and
  causing the first energy storage device to be installed at the first wind farm to serve the second energy storage requirement.

11. The computer-implemented method of claim 10, wherein the first energy storage device is scheduled to serve the second energy storage requirement until an end of life of the first wind farm.

12. The computer-implemented method of claim 7, wherein the second energy storage requirement is at the second wind farm, and scheduling the first energy storage device to serve the second energy storage requirement further comprises:
  causing the first energy storage device to be uninstalled from serving the first energy storage requirement;
  causing a second energy storage device to be installed at the first wind farm to serve the first energy storage requirement; and
  causing the first energy storage device to be installed at the second wind farm to serve the second energy storage requirement.

13. The computer-implemented method of claim 12, wherein the first energy storage device is scheduled to serve the second energy storage requirement until an end of life of the second wind farm.

14. The computer-implemented method of claim 12, wherein the first energy storage device cooperates with a second energy storage device to serve the second energy storage requirement at the second wind farm.

15. The computer-implemented method of claim 7, wherein each of the first energy storage requirement and the second energy storage requirement is one of power fluctuation suppression, grid power stabilization, power forecast accuracy improvement, transmission curtailment power storage, power capacity firming, and power production time shifting.

16. A computer program product, comprising:
  a non-transitory computer readable storage medium; and
  program instructions stored on the computer readable storage medium and, which when executed by a processor, perform an operation for optimizing energy storage device scheduling in wind energy applications, the operation comprising:
    comparing an attribute of a first energy storage device located at a first physical location at a first wind farm with a threshold for a first energy storage requirement served by the first energy storage device at the first wind farm; and
    in response to the attribute being less than or equal to the threshold, scheduling the first energy storage device for physical relocation from the first physical location to a second physical location to serve a second energy storage requirement at one or more of the first wind farm and a second wind farm; and
    communicating with the first energy storage device at the second physical location.

17. The power production system of claim 1, wherein the second energy storage requirement is at the first wind farm.

18. The computer-implemented method of claim 7, wherein scheduling the first energy storage device to serve a second energy storage requirement further comprises determining a length of time that the first energy storage device will satisfy a threshold for the second energy storage requirement.

19. The computer-implemented method of claim 7, wherein scheduling the first energy storage device to serve a second energy storage requirement further comprises predicting one or more future functional requirements for each of the first and second energy storage applications requirements.

20. The computer-implemented method of claim 7, wherein the first wind farm comprises a plurality of energy storage devices, wherein scheduling the first energy storage device to serve a second energy storage requirement further comprises projecting a future capacity for each of the plurality of energy storage devices, and wherein scheduling the first energy storage device to serve a second energy storage requirement is based on the projected future capacities.

* * * * *